United States Patent
Basso et al.

(10) Patent No.: US 11,129,259 B2
(45) Date of Patent: *Sep. 21, 2021

(54) METHOD AND APPARATUS FOR MULTI-EXPERIENCE METADATA TRANSLATION OF MEDIA CONTENT WITH METADATA

(71) Applicant: AT&T Intellectual Property I, L.P., Atlanta, GA (US)

(72) Inventors: Andrea Basso, Turin (IT); Tara Hines, New York, NY (US); Aleksey Ivanov, Middletown, NJ (US); Jeffrey Mikan, Atlanta, GA (US); Nadia Morris, Pacifica, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/664,260

(22) Filed: Oct. 25, 2019

(65) Prior Publication Data

US 2020/0059501 A1 Feb. 20, 2020

Related U.S. Application Data

(60) Continuation of application No. 15/263,792, filed on Sep. 13, 2016, now Pat. No. 10,491,642, which is a (Continued)

(51) Int. Cl.
*G06F 17/21* (2006.01)
*H05B 47/165* (2020.01)
(Continued)

(52) U.S. Cl.
CPC ......... *H05B 47/165* (2020.01); *G06F 3/0484* (2013.01); *G06F 3/165* (2013.01);
(Continued)

(58) Field of Classification Search
None
See application file for complete search history.

(56) References Cited

U.S. PATENT DOCUMENTS

| 4,511,921 A | 4/1985 | Harlan et al. |
| 4,646,161 A | 2/1987 | Tsuchiya et al. |
| (Continued) | | |

FOREIGN PATENT DOCUMENTS

JP  64032332 U  2/1989

OTHER PUBLICATIONS

"PlayStation 3 System Software User's Guide", Jan. 13, 2007; Playstation.net; pp. 1-2.
(Continued)

*Primary Examiner* — Maikhanh Nguyen
(74) *Attorney, Agent, or Firm* — Guntin & Gust, PLC; Jay H. Anderson

(57) ABSTRACT

A method or apparatus that incorporates teachings of the present disclosure may include, for example, a method for retrieving a plurality of sensory information from an environment of a device. A digital representation of the environment of the device is identified corresponding to the plurality of sensory information from the environment of the device. A media presentation element of the device associated with media content of the device is identified. A user interface of the media presentation element is adapted to modify a presentation of the media content by the media presentation element of the device according to the digital representation of the environment of the device. Other embodiments are disclosed.

20 Claims, 8 Drawing Sheets

Related U.S. Application Data continuation of application No. 14/732,005, filed on Jun. 5, 2015, now Pat. No. 9,473,547, which is a division of application No. 13/185,493, filed on Jul. 18, 2011, now Pat. No. 9,084,001.

(51) Int. Cl.

| | |
|---|---|
| *H04N 21/422* | (2011.01) |
| *H04N 21/84* | (2011.01) |
| *H04W 4/70* | (2018.01) |
| *H04N 21/2668* | (2011.01) |
| *G06F 3/0484* | (2013.01) |
| *H04L 29/06* | (2006.01) |
| *G06F 3/16* | (2006.01) |
| *G06K 9/62* | (2006.01) |
| *H04N 21/658* | (2011.01) |
| *A63F 13/65* | (2014.01) |

(52) U.S. Cl.
CPC .......... *G06K 9/6215* (2013.01); *H04L 65/403* (2013.01); *H04N 21/2668* (2013.01); *H04N 21/42202* (2013.01); *H04N 21/84* (2013.01); *H04W 4/70* (2018.02); *A63F 13/65* (2014.09); *H04N 21/6582* (2013.01)

(56) References Cited

U.S. PATENT DOCUMENTS

| | | | |
|---|---|---|---|
| 4,947,242 A | 8/1990 | Hieda | |
| 5,061,997 A | 10/1991 | Rea et al. | |
| 5,252,951 A | 10/1993 | Tannenbaum | |
| 5,572,635 A | 11/1996 | Takizawa et al. | |
| 5,821,989 A | 10/1998 | Lazzaro et al. | |
| 5,963,371 A | 10/1999 | Needham et al. | |
| 6,080,063 A | 6/2000 | Khosla | |
| 6,172,719 B1 | 1/2001 | Kim | |
| 6,272,127 B1 | 8/2001 | Golden et al. | |
| 6,466,234 B1 | 10/2002 | Pyle et al. | |
| 6,466,334 B1 | 10/2002 | Komiya et al. | |
| 6,512,520 B1 | 1/2003 | Naka et al. | |
| 6,529,209 B1 | 3/2003 | Dunn et al. | |
| 6,912,429 B1 | 6/2005 | Bilger | |
| 6,959,389 B1 | 10/2005 | Dunn et al. | |
| 6,980,177 B2 | 12/2005 | Struyk | |
| 7,092,037 B2 | 8/2006 | Huh et al. | |
| 7,191,338 B2 | 3/2007 | Stern et al. | |
| 7,202,613 B2 | 4/2007 | Morgan et al. | |
| 7,319,755 B2 | 1/2008 | Struyk | |
| 7,348,736 B2 | 3/2008 | Piepgras et al. | |
| 7,613,310 B2 | 11/2009 | Mao | |
| 7,680,295 B2 | 3/2010 | Yoda | |
| 7,805,017 B1 | 9/2010 | Basso et al. | |
| 7,840,344 B2 | 11/2010 | Sloo | |
| 7,843,486 B1 | 11/2010 | Blair et al. | |
| 8,016,653 B2 | 9/2011 | Milnes et al. | |
| 8,091,038 B1 | 1/2012 | Johnson et al. | |
| 8,138,930 B1 | 3/2012 | Heath | |
| 8,207,846 B2 | 6/2012 | Van Hoff et al. | |
| 8,255,957 B1 | 8/2012 | Mattox et al. | |
| 8,324,826 B2 | 12/2012 | Verberkt et al. | |
| 8,346,376 B2 | 1/2013 | Engelen et al. | |
| 8,403,105 B2 | 3/2013 | Lee et al. | |
| 8,463,408 B2 | 6/2013 | Boleko Ribas | |
| 8,560,955 B2 | 10/2013 | Jana et al. | |
| 8,565,905 B2 | 10/2013 | Engelen | |
| 8,626,236 B2 | 1/2014 | Lindner et al. | |
| 8,634,597 B2 | 1/2014 | Ivanov et al. | |
| 8,743,953 B2 | 6/2014 | Bekiares et al. | |
| 8,780,161 B2 | 7/2014 | Samadani et al. | |
| 8,803,816 B2 | 8/2014 | Kilpatrick, II et al. | |
| 2002/0004918 A1 | 1/2002 | Mathieu et al. | |
| 2002/0180973 A1 | 12/2002 | MacKinnon et al. | |
| 2003/0080935 A1 | 5/2003 | Yang | |
| 2003/0118183 A1 | 6/2003 | Struyk | |
| 2004/0075738 A1 | 4/2004 | Burke et al. | |
| 2005/0085296 A1 | 4/2005 | Gelb et al. | |
| 2005/0087671 A1 | 4/2005 | Park | |
| 2005/0097604 A1 | 5/2005 | Shintani et al. | |
| 2005/0120128 A1 | 6/2005 | Willes et al. | |
| 2005/0275626 A1 | 12/2005 | Mueller et al. | |
| 2006/0034487 A1 | 2/2006 | Franz et al. | |
| 2006/0041758 A1 | 2/2006 | Dunn et al. | |
| 2006/0050018 A1 | 3/2006 | Hutzel et al. | |
| 2006/0064477 A1 | 3/2006 | Renkis et al. | |
| 2006/0112339 A1 | 5/2006 | Struthers et al. | |
| 2006/0247060 A1 | 11/2006 | Hanson et al. | |
| 2006/0281552 A1 | 12/2006 | Bulusu et al. | |
| 2007/0121958 A1 | 5/2007 | Berson | |
| 2007/0146494 A1 | 6/2007 | Goffin et al. | |
| 2007/0257928 A1 | 11/2007 | Marks et al. | |
| 2008/0021963 A1 | 1/2008 | Jana et al. | |
| 2008/0051033 A1 | 2/2008 | Hymes | |
| 2008/0144967 A1 | 6/2008 | Struyk | |
| 2008/0195692 A1 | 8/2008 | Hayosh et al. | |
| 2008/0218501 A1 | 9/2008 | Diamond et al. | |
| 2008/0235587 A1 | 9/2008 | Heie et al. | |
| 2008/0316372 A1 | 12/2008 | Xu et al. | |
| 2008/0318683 A1 | 12/2008 | Rofougaran et al. | |
| 2009/0003600 A1 | 1/2009 | Chen et al. | |
| 2009/0046140 A1 | 2/2009 | Lashmet et al. | |
| 2009/0066722 A1 | 3/2009 | Kriger et al. | |
| 2009/0079813 A1 | 3/2009 | Hildreth et al. | |
| 2009/0087161 A1 | 4/2009 | Roberts et al. | |
| 2009/0109129 A1 | 4/2009 | Cheong et al. | |
| 2009/0146982 A1 | 6/2009 | Thielman et al. | |
| 2009/0195670 A1 | 8/2009 | Koishi | |
| 2009/0201271 A1 | 8/2009 | Michiyasu et al. | |
| 2009/0204989 A1 | 8/2009 | White et al. | |
| 2009/0244364 A1 | 10/2009 | Nonogaki | |
| 2009/0253512 A1 | 10/2009 | Nickell et al. | |
| 2009/0262946 A1 | 10/2009 | Dunko | |
| 2009/0291757 A1 | 11/2009 | Hilbert et al. | |
| 2009/0300525 A1 | 12/2009 | Jolliff et al. | |
| 2010/0004918 A1 | 1/2010 | Lee | |
| 2010/0026794 A1 | 2/2010 | Chang | |
| 2010/0027961 A1 | 2/2010 | Gentile et al. | |
| 2010/0036717 A1 | 2/2010 | Trest | |
| 2010/0049476 A1 | 2/2010 | Engelen et al. | |
| 2010/0064244 A1 | 3/2010 | Daley et al. | |
| 2010/0079426 A1 | 4/2010 | Pance et al. | |
| 2010/0079585 A1 | 4/2010 | Nemeth | |
| 2010/0090617 A1 | 4/2010 | Verberkt et al. | |
| 2010/0097469 A1 | 4/2010 | Blank et al. | |
| 2010/0125800 A1 | 5/2010 | Jana et al. | |
| 2010/0134050 A1 | 6/2010 | Engellen et al. | |
| 2010/0220109 A1 | 9/2010 | Aoki et al. | |
| 2010/0277452 A1 | 11/2010 | Muraki et al. | |
| 2010/0283393 A1 | 11/2010 | Boleko Ribas | |
| 2010/0284525 A1 | 11/2010 | Sander et al. | |
| 2010/0299445 A1 | 11/2010 | Amsterdam et al. | |
| 2010/0302138 A1 | 12/2010 | Poot et al. | |
| 2010/0318201 A1 | 12/2010 | Cuppen et al. | |
| 2011/0074914 A1 | 3/2011 | Jeong et al. | |
| 2011/0109250 A1 | 5/2011 | Engelen | |
| 2011/0204793 A1 | 8/2011 | Gardner, Jr. | |
| 2011/0232989 A1 | 9/2011 | Lee et al. | |
| 2012/0019633 A1 | 1/2012 | Holley | |
| 2012/0047023 A1 | 2/2012 | Kruglick | |
| 2012/0069131 A1 | 3/2012 | Abelow et al. | |
| 2012/0099641 A1 | 4/2012 | Bekiares et al. | |
| 2012/0135783 A1 | 5/2012 | Sams | |
| 2012/0140019 A1 | 6/2012 | Jung et al. | |
| 2012/0224019 A1 | 9/2012 | Samadani et al. | |
| 2016/0342221 A1 | 11/2016 | Basso et al. | |
| 2016/0381098 A1 | 12/2016 | Basso et al. | |
| 2018/0190012 A1 | 7/2018 | Basso et al. | |

(56) References Cited

OTHER PUBLICATIONS

Kansal, Aman, "Bluetooth Primer", 30 pages (2002) available at http://www.eng.wayne.edu/~smahmud/BiuetoothWeb/BluetoothTutorial.pdf.

Lee, Johnny C. et al., "Automatic projector calibration with embedded light sensors", In Proceedings of the 17th annual ACM symposium on User interface software and technology, ACM, 2004, 123-126.

Wiley, M., "Logitech Cordless Action Controller Review", Jun. 10, 2004; IGN.com; pp. 1-9.

Back, Maribeth et al., "The Virtual Chocolate Factory: Building a Real World Mixed-Reality System for Industrial Collaboration and Control", IEEE Xplore; downloaded Aug. 31, 2020, 2010, 6 pages.

700

__US 11,129,259 B2__

METHOD AND APPARATUS FOR MULTI-EXPERIENCE METADATA TRANSLATION OF MEDIA CONTENT WITH METADATA

CROSS-REFERENCE TO RELATED APPLICATIONS

This application is a continuation of U.S. application Ser. No. 15/263,792, filed Sep. 13, 2016 (now U.S. Pat. No. 10,491,642), which is a continuation of U.S. application Ser. No. 14/732,005, filed Jun. 5, 2015 (now U.S. Pat. No. 9,473,547), which is a divisional of U.S. application Ser. No. 13/185,493, filed Jul. 18, 2011 (now U.S. Pat. No. 9,084,001), which are incorporated herein by reference in their entirety.

FIELD OF THE DISCLOSURE

The present disclosure relates generally to media content and more specifically to a multi-experience translation of media content with metadata.

BACKGROUND

Media content is generally experienced by consumers via devices such as computers, televisions, radios, and mobile electronics. Media content is frequently delivered by service providers, who send media content, such as television programs, radio, and video, directly to consumers for enjoyment at their physical location. Service providers also often provide access to the internet and to internet-based media content, such as websites, games, social networking, and virtual-reality applications. Consumer media content experiences can be affected by their sensory environment.

DETAILED DESCRIPTION

Figure 1:
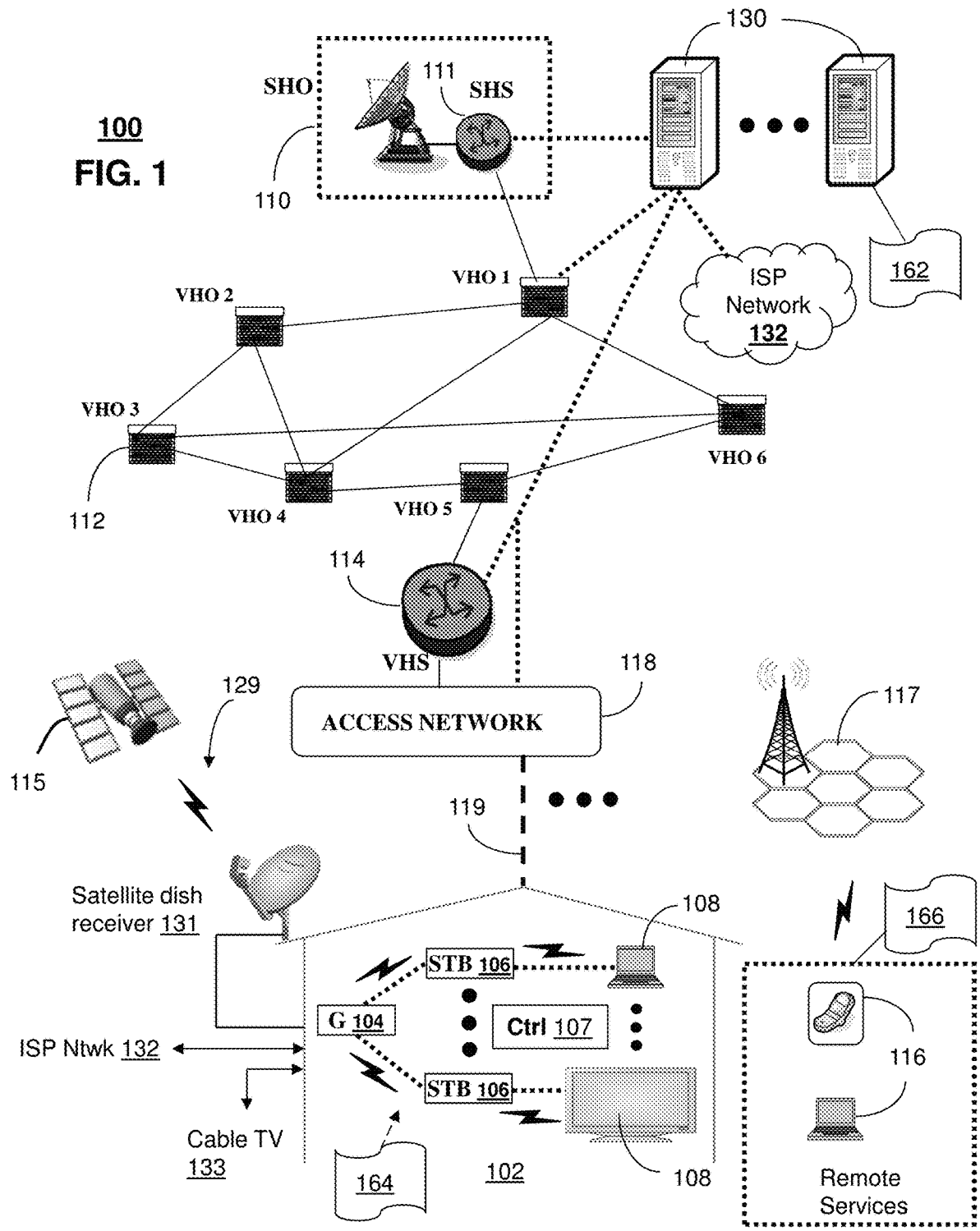
FIGS. 1-2 depict illustrative embodiments of communication systems that provide media services.

The present disclosure describes, among other things, illustrative embodiments for adaptation of media content in accordance with a consumer sensory environment. In one embodiment, differences between sensory environments between a source device and a recipient device are used for media content adaptation. Other embodiments are contemplated by the present disclosure.

One embodiment of the present disclosure includes a recipient device having a memory and a processor. The processor can be operable to receive media content from a source device. The media content can include metadata associated with the media content. The metadata can correspond to a digital representation of an environment of the source device. The processor can also be operable to retrieve sensory information from an environment of the recipient device. The processor can further be operable to identify a digital representation of the environment of the recipient device corresponding to the sensory information from the environment of the recipient device. The processor can be operable determine differences between the digital representation of the environment of the source device and the digital representation of the environment of the recipient device. The processor can also be operable to receive media content from the source device. The processor can be further operable to modify a presentation of the media content according to the differences between the digital representation of the environment of the source device and the digital representation of the environment of the recipient device.

One embodiment of the present disclosure includes a device having a memory and a processor. The processor can be operable to receive media content from a source device. The media content comprises metadata associated with the media content and corresponding to a digital representation of an environment of a source device. The processor can also be operable to receive a digital representation of an environment of a recipient device corresponding to sensory information from the environment of the recipient device. The processor can further be operable to determine differences between the digital representation of the environment of the source device and the digital representation of the environment of the recipient device. The processor can also be operable to modify a presentation of the media content to generate modified media content according to the differences between the digital representation of the environment of the source device and the digital representation of the environment of the recipient device. The processor can be operable to provide the adapted media content to the recipient device over a communication system.

One embodiment of the present disclosure includes a method where sensory information from an environment of a device can be retrieved. A digital representation of the environment of the device corresponding to the plurality of sensory information from the environment of the device can also be identified. A media presentation element of the device associated with media content of the device can further be identified. A user interface of the media presentation element can be adapted to modify a presentation of the media content by the media presentation element on the device. The user interface of the media presentation can be adapted according to the digital representation of the environment of the device.

U.S. patent application Ser. No. 13/185,487, filed Jul. 18, 2011, by Basso et al., U.S. Patent Publication Number 2013-0024774 (published Jan. 24, 2014), entitled "Method and Apparatus for Multi-Experience Adaptation of Media Content," is incorporated herein by reference.

FIG. 1 depicts an illustrative embodiment of a communication system 100 for delivering media content. The novel communication system 100 can collect sensory data characterizing an environment at a source device for media content. The communication system 100 can identify the environmental characteristics as metadata corresponding to a digital representation of the environment of the source device. This metadata can be included with the media content. The novel communication system 100 can then compare the digital representation of the source device environment with a digital representation of an environment of a recipient device to detect differences. The communication system 100 can use these detected differences to modify a presentation of the media content, such as at the recipient device.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, ZigBee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or portable communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a media content adaptation server (herein referred to as server 130). The server 130 can use common computing and communication technology to perform function 162, which includes among other things, modification of media content in accordance with a consumer's environment. The server 130 can be used to receive media content from a source device, such as one of the media processors 106, media devices 108, or portable communication devices 116. The media content can include metadata corresponding to a digital representation of an environment of the source device. The server 130 can also be used to retrieve sensory information from an environment of a recipient device, such as another of the media processors 106, media devices 108, or portable communication devices 116. The server 130 can further be used to identify a digital representation of the environment of the recipient device corresponding to the sensory information from the environment of the recipient device. The server 130 can be used to determine differences between the digital representations of the environments of the source and recipient devices. The server 130 can also be used to modify a presentation of media content according to the differences between the digital representations of the environments of the source and recipient devices. The server 130 can further be used to provide the modified media content to the recipient device over the communication system 100. The media processors 106 and portable communication devices 116 can be adapted with software functions 164 and 166, respectively, to further utilize the services of the server 130. For example, the media processors 106 and portable communication devices 116 can be adapted to execute software functions 164 and 166, respectively, to collect and report sensory data representing characteristics of the environments of the media processors 106 and portable communication devices 116, respectively.

Figure 2:
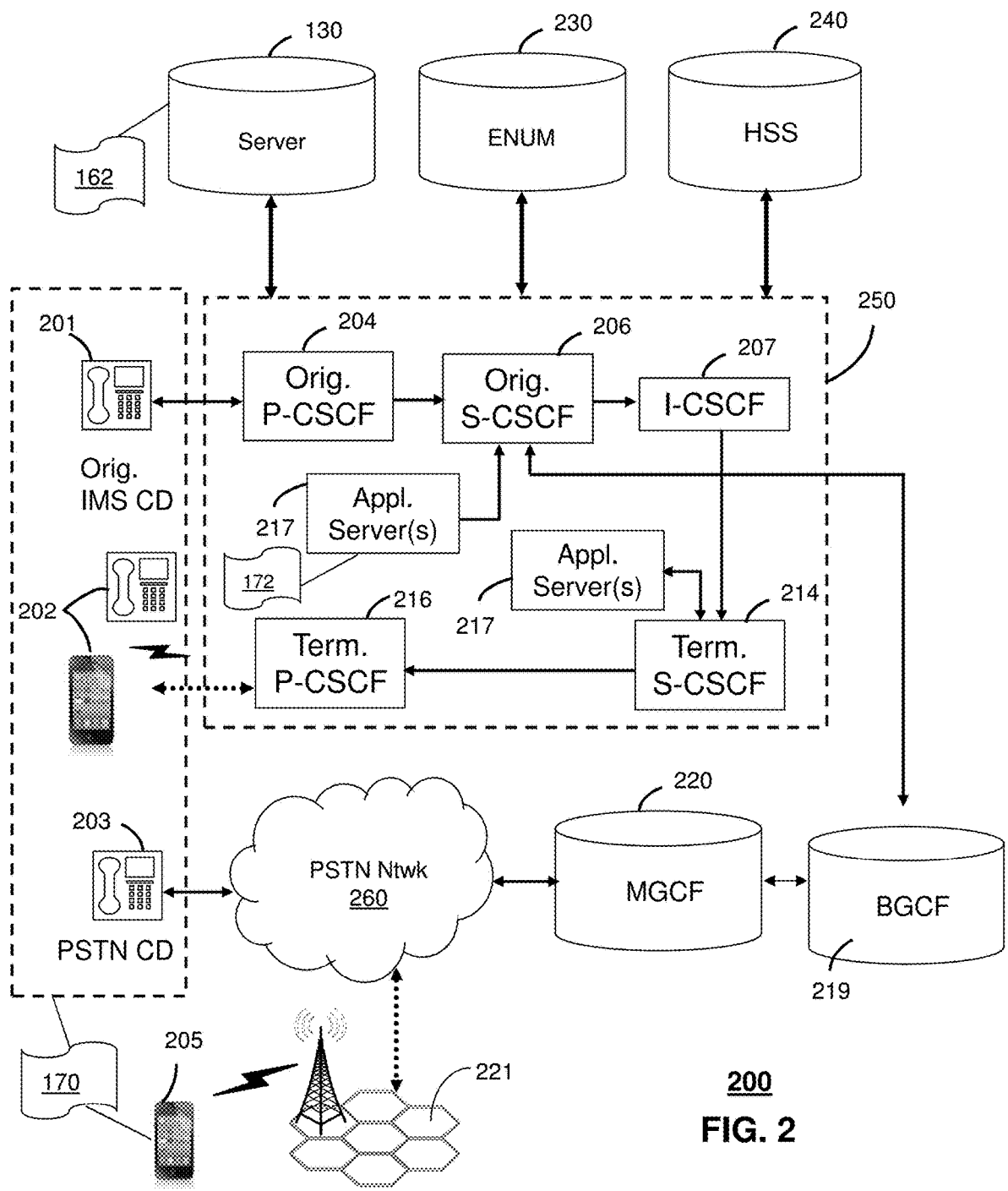

FIG. 2 depicts an illustrative embodiment of a communication system 200 employing IP Multimedia Subsystem (IMS) network architecture to facilitate the combined services of circuit-switched and packet-switched systems. Communication system 200 can be overlaid or operably coupled with communication system 100 as another representative embodiment of communication system 100. The novel communication system 200 can collect sensory data characterizing an environment at a source device for media content. The communication system 200 can also identify these environmental characteristics as metadata corresponding to a digital representation of the environment of the source device. This metadata can be included with the media content. The novel communication system 200 can then compare the digital representation of the source device environment with a digital representation of an environment of a recipient device to detect differences. The communication system 100 can then use these detected differences to modify a presentation of the media content, such as at the recipient device.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E. 164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled with server 130 of FIG. 1 for purposes similar to those described above. It is further contemplated by the present disclosure that the server 130 can perform the function 162 and thereby provide a media content adaptation application for subscribers associated with CDs 201, 202, 203, and 205. CDs 201, 202, 203, and 205 can be adapted with software to perform function 170 to utilize and integrate with the multi-experience adaptation application performed by the server 130. It is further contemplated that the server 130 can be an integral part of the application server(s) 217, where the application server(s) 217 performs function 172, which can be substantially similar to function 162 and adapted to the operation of the IMS network 250.

Figure 3:
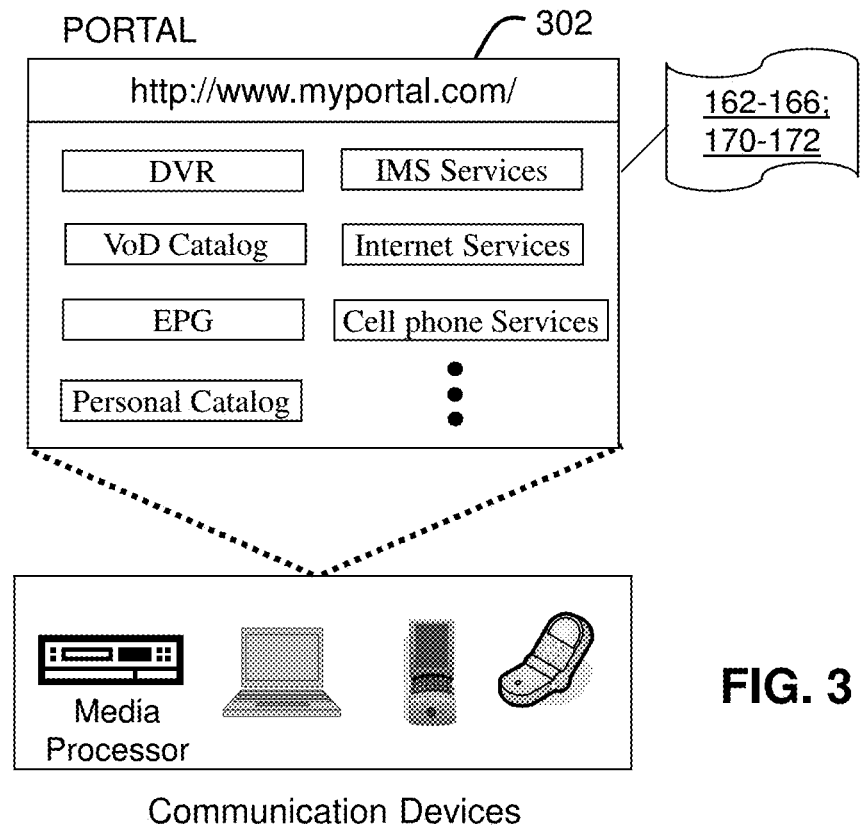
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-

200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
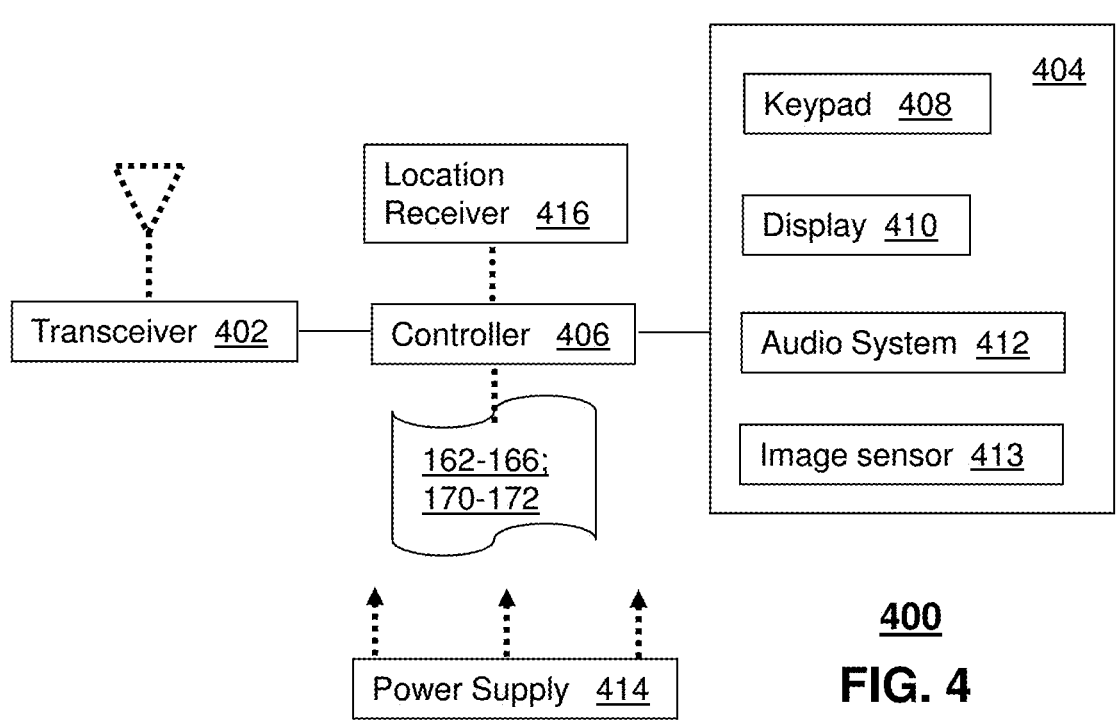
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The novel communication device 400 can capture sensory data corresponding to environmental characteristics at the communication device. The novel communication device 400 can transmit the environmental characteristics as metadata along with streaming media content. The novel communications device 400 can adapt its graphical user interface to account for differences in environmental conditions. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Illustrative embodiments of methods that can operate in portions of the communication device of FIG. 4 are described below.

Figure 5:
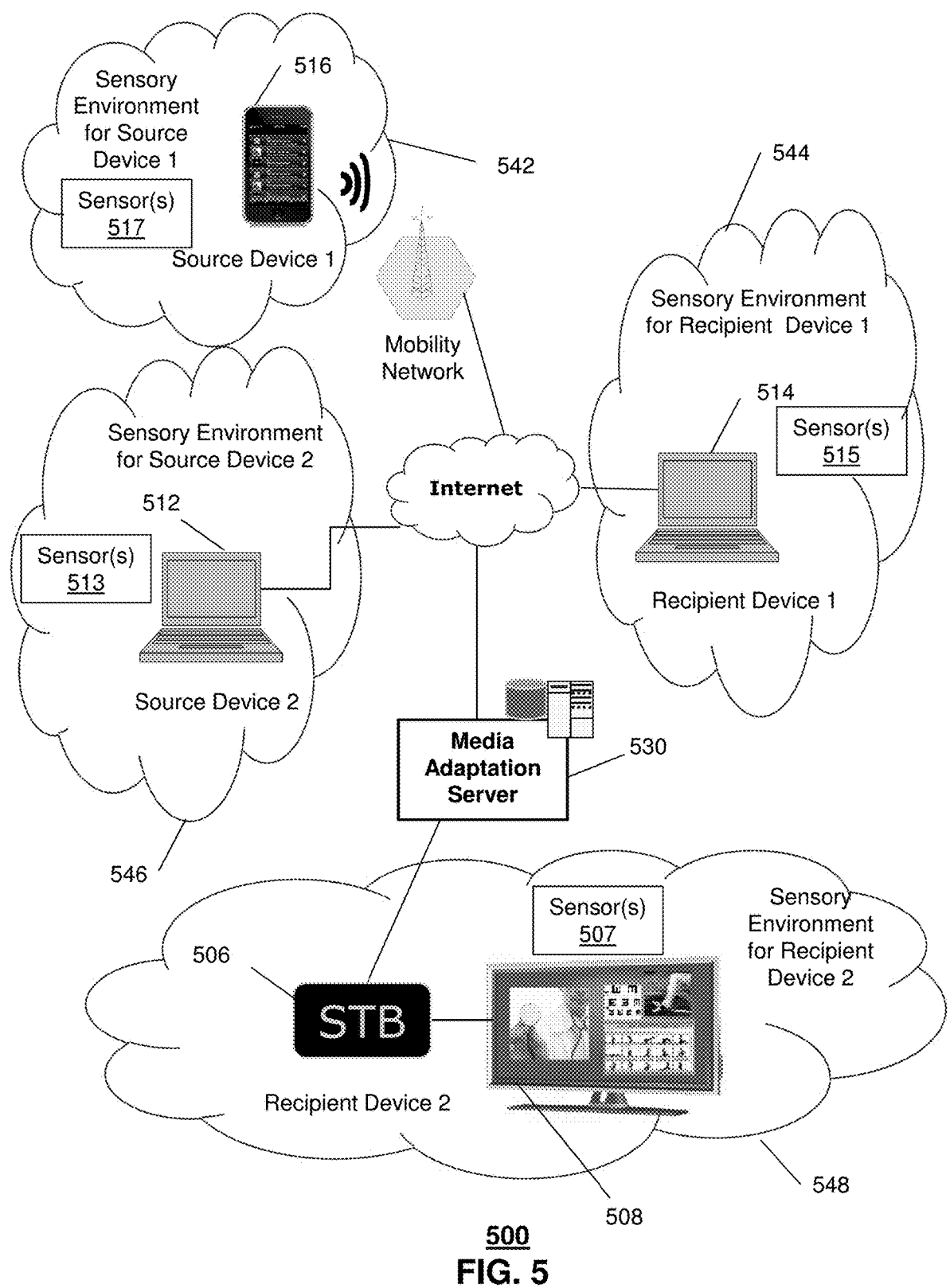
FIG. 5 depicts an illustrative embodiment of a system.

FIG. 5 depicts an illustrative embodiment of a system 500 for adaptation of media content in accordance with a consumer sensory environment. System 500 can be overlaid or operably coupled to communication systems 100-200 as another representative embodiment of communication systems 100-200. System 500 can include a server 530 in communication with media processors 506 (such as set-top boxes), computing devices 512 and 514 (such as a laptop computer, tablet, etc.), and wireless communication devices 516 (such as mobile phones, smart phones, etc.). The mobile devices 516 can be communicatively coupled to the server 530 by way of a mobility network coupled to the Internet or other communication means. The computing devices 512 can also be communicatively coupled to the server 530 by way of the Internet or other communication means.

The server 530 can be capable of modifying media content in accordance with a consumer's sensory environment. The server 530 can be used to receive media content from a first source device 516. The media content from the first source device 516 can include metadata corresponding to a digital representation of a sensory environment 542 of the first source device 516. The server 530 can further be used to receive a digital representation of an environment 544 of a first recipient device 514 corresponding to a plurality of sensory information from the environment of the first recipient device 514. The server 530 can be used to determine differences between the digital representations of the environments 542 and 544 of the first source device 516 and the first recipient device 514. The server 530 can further be used to modify a presentation of the media content according to the differences between the digital representations of the environments 542 and 544 of the first source device 516 and the first recipient device 514. The server 530 can further be used to provide the modified media content to the first recipient device 514 over the communication system 100.

In one example, the first source device 516 can be a wireless or mobile communications device coupled to the communications system 100 through a mobility network. The first recipient device 514 can be a computing device. In another example, a second source device 512 can be a computing device operating in a sensory environment 546, while a second recipient device 506 can be a media processor, such as a set-top box, that presents the media content on a display device, operating in a sensory environment 548.

Each of environments 542-548 can comprise sensors 507, 513, 515 and 517 to provide server 530 sensor data. The sensors can be virtual or physical. In an embodiment where the sensors 507, 513, 515 and 517 are physical sensors, these sensors can utilize technology that provides the server 530 sensory information that includes without limitation temperature, weather, lighting, color, images, video, audio, location information, time, season of the year, aroma, and type of establishment from which the source or recipient device is operating. Virtual sensors can be an integral part of a virtual application operating in the source or recipient devices. A virtual application in the present context can represent a video game, virtual game such as Second Life™, an application including avatars, or a social media application. The virtual sensors can also provide the server 530 sensory information such as temperature, weather, lighting, color, images, video, audio, location information, time, season of the year, aroma, and type of establishment presented by the virtual application. Other forms of sensory data such a motion data (velocity, acceleration, etc.), orientation data (e.g., compass information) and other forms of virtual applications are contemplated by the present disclosure.

Figure 6:
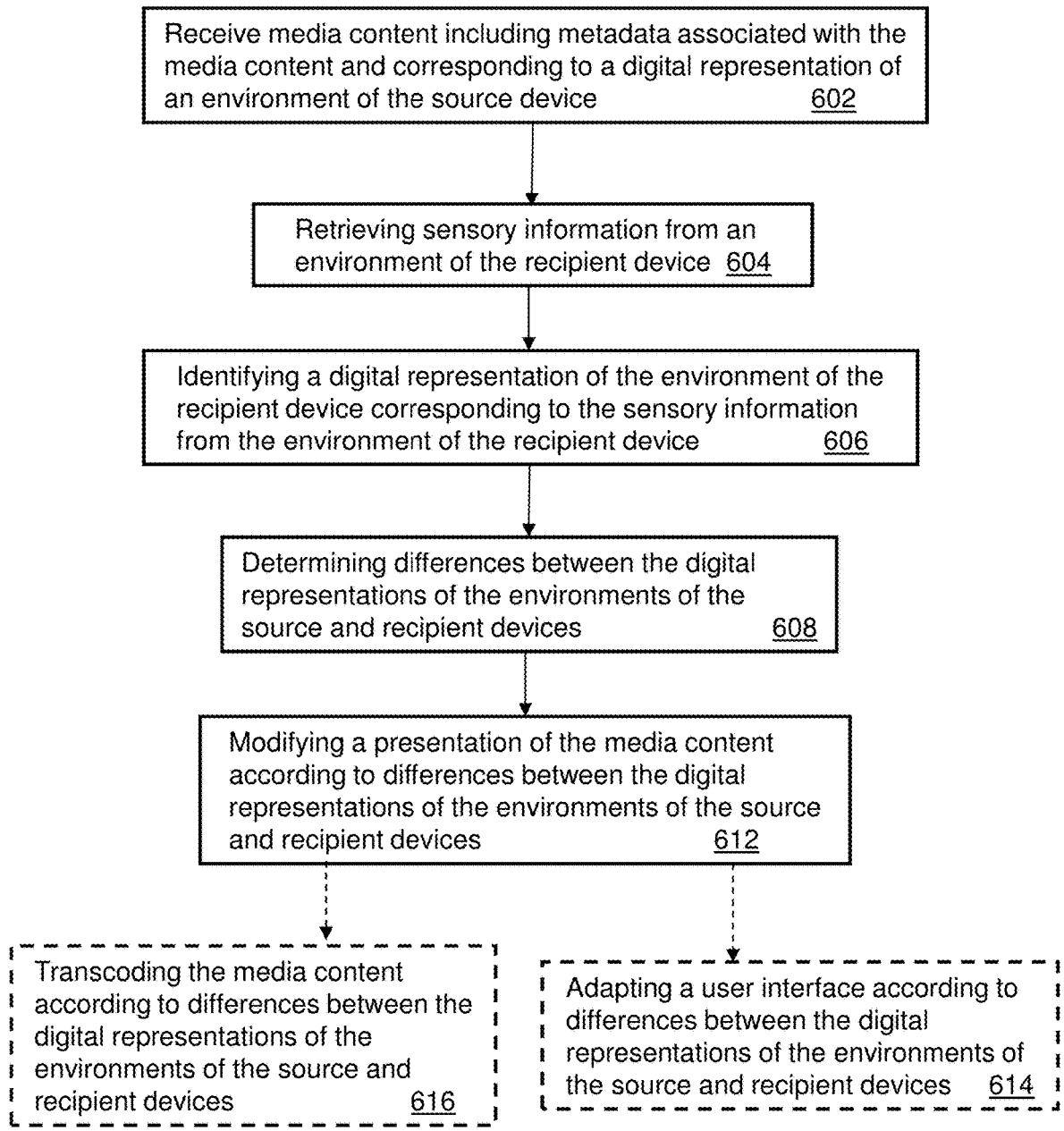
FIGS. 6-8 depicts an illustrative embodiment of a method operating in portions of the systems described in FIGS. 1-5.

FIG. 6 depicts an illustrative method 600 that operates in portions of the devices of FIGS. 1-5. Method 600 can begin with step 602 in which a recipient device 506, 514 can receive media content from a source device 512, 516. The recipient device 506, 514 can be a media processor 106, such as a set-top box. The media processor 106 can be connected to the communication system 100 via a gateway 104. The media processor 106 can deliver media content from the communication system 100 to a media device 108, such as a television or a computing device. The recipient device 506, 514 can be a portable communication device 116, such as a computing device, wireless computing device, or mobile communications device, and can receive media content from the communication system 100 via a mobility network. As with the recipient device 506, 514, the source device 512, 516 can also be a media processor 106, such as a set-top box, and can be connected to the communication system 100 via a gateway 104. The source device 512, 516 can be a portable communication device 116, such as a computing device, wireless computing device, or mobile communications device, and can receive media content from the communication system 100 via a mobility network.

The media content can be any combination of text, audio, still images, video, three-dimensional images and video, graphics, or computer-generated media, and virtual gaming or avatar-based content. The media content can be associated with television programming, movies, concerts, news, books, articles, audio communication, text messaging, SMS, instant messaging, weather reports, programming information, community information, captioning, video game applications, virtual world applications, applications including avatars, social media applications, and websites. The media content can originate at the source device 512, 516 or from a service provider operating on the communication system 100. A service provider can provide limited services, such as only providing media programming, or can provide broad-based services, such as media programming, cellular phone, internet access, and on-demand services. These services can serve as an originating point for all or part of the media content at the source device 512, 516. The media content can be a combination of content sourced from the service provider and content generated or modified by the source device 512, 516. The media content can be received by the recipient device 506, 514 directly from the source device 512, 516, can be received by the recipient device 506, 514 from the service provider, or can be received by the recipient device 506, 514 from the server 530.

The media content from the source device 512, 516 can include metadata corresponding to a digital representation of an environment 542, 546 of the source device 512, 516. The environment 542, 546 of the source device 512, 516 can be based on sensory data collected at the source device. A recipient device 506, 514 can also have an environment 544, 548 that can be represented by sensory data collected at that recipient device. Sensory data can represent an environment 542, 546 of the source device 512, 516 or an environment 544, 548 of a recipient device 506, 514. Sensory data representing characteristic of the environment of the source or recipient device can be derived from a "world" in which the device is operating. This "world" can be a physical world or a virtual world. A physical world for a source or recipient device can be described as environmental conditions that can be physically experienced by one consuming media content at the source or recipient device. A virtual world for a source or recipient device can be described as environmental conditions presented by the source or recipient device for a consumer of virtual content to virtually experience. Physical and virtual worlds and the collection, distribution, and use of sensory data representing a physical or virtual environment are further described below with respect to a source device 512, 516. However, it is to be understood that similar sensory data can be collected, distributed, and used for representing a physical or virtual environment for a recipient device 506, 514. In one embodiment, the sensory data can be derived in a physical environment from sensors 507, 513, 515 and 517 as described earlier.

The physical world can be described as a collection of environmental conditions and can be assessed by measuring and collecting sensory data representing these environmental conditions. For example, sensory data can be collected for levels of lighting, temperature, and colors, for background audio, video, and images, and for location details, such as room spatial features, time-zone, season, and type of establishment (home or commercial). The source device 512, 516 can be described as operating in a sensory environment 546, 542 that includes a compilation of sensory data for the physical world of the source device. For example, temperature, light intensity, and colorimetric data, aromatic data, background audio, video, and still images, and location information can be collected at the source device 512, 516. Sensory data for the sensory environment 546, 542 can be captured and/or compiled by sensors 513 and 517 operating in the source device 512, 516, or by other devices coupled to the communication system 100, or by a combination of both. Sensory data can detect characteristics, such as sound levels or lighting, that are consistent with of home or commercial environments to thereby detect and report a type of establishment.

The sensory data of the physical environment for the source device 512, 516 can be translated into a standard formats, before being communicated to the recipient device 506, 514 or to the media adaptation server 530. For example, raw temperature data can be initially collected at the source device 512, 516 by direct sensing using a thermo probe. The raw temperature data can be converted into a series of digital readings, statistically converted to a mean temperature or median temperature or range of temperatures as needed. A single temperature, such as the mean or median, or a temperature range can then be reported from the source device 512, 516 and received at the recipient device 506, 514, or server 530. A similar approach can be used for other sensory data, such as light intensity, colorimetric data, aromatic data, or volume of background sound or audio.

The sensory data of the physical environment for the source device 512, 516 can include audio, video, and still images. For example, a painting might appear on a wall at the location of the source device. This painting represents a sensory aspect of the physical environment that can be replicated exactly or in modified form at a recipient device 506, 514. The painting image can be captured at the source device 512, 516, by means of, for example, a camera device. The captured image can be saved as an image file, such as a Joint Photographic Experts Group, or JPEG, image file, or as another image file format. Similarly, background audio content, such as recorded or live music or soundtrack, ambient noise, or any combination of sound present at the source device 512, 516, can be captured by means of, for example, a microphone device. The captured sound can be saved as a sound file, such as a Moving Picture Experts Group, or MPEG, sound file, or as another image file format. Similarly, background video or a combination of video and audio or of video, audio, and still images can be captured at the source device. For example, a video camera or a combination of a video camera and microphone could be used to capture video of the environment of the source device 512, 516. Video data can be saved, for example, as MPEG video files.

The sensory data of the physical environment for the source device 512, 516 can include location information. For example, the location of the source device 512, 516 can be captured by accessing Global Positioning System (GPS) satellite services. If the source device 512, 516 is physically attached to the communication system 100, then its location can be determined by reference to the location of other entities of known locations. For example, if the source device 512, 516 is connected to a router in a building of known location, then the location of the building can be reported as the location. If the source device 512, 516 accesses the communication system via a component of a mobility network 117, such as specific cell tower, then the location of the mobility network component can be used.

The sensory data of the physical environment of the source device 512, 516 can be provided to the recipient device 506, 514 or the media adaptation server 530. The sensory data can be sent as streaming data, files, or messages. The sensory data can be continuously updated or can be periodic snapshots of environmental conditions. For example, temperature can reported each hour or can reported continuously with each data transmission. Video data can be sent as a continuous stream or can be converted into a series of still image snapshots to conserve system bandwidth.

Sensory data representing a virtual "world" of a source device 512, 516 can include environmental components that can be experienced virtually by one consuming virtual media content at the source device 512, 516. A virtual world can be an environment that is presented by the source device 512, 516 as part of some type of virtual media content. Virtual media content can include video game applications, virtual world applications, applications that include avatars, social media applications, and websites. Virtual media content can incorporate scenarios, perspectives, and role-playing attributes that allow a consumer of the virtual media content to mentally experience various aspects of another world, persona, or reality. Virtual media content can include virtual representations of otherwise physical phenomena, such as lighting, temperature, color, aroma, sound, movement, video, images, and spatial relationships. This "virtual" sensory data imitates physical phenomena within a virtual context to bring a sense or "realness" to the experience for the consumer.

Virtual sensory data representing components of the virtual environment can be available at the source device 512, 516 as digital data that is accessed by a video game or virtual world application executing on the source device. This virtual sensory data for the virtual environment can be accessible by the game or application from graphics data files, MPEG files, JPEG files, and parameter files. The virtual sensory data can also be accessible to the source device 512, 516 by accessing or parsing these files as saved in local storage or as made available from a network source. The source device 512, 516 can be used a display device that merely reproduces graphics and audio from a data stream. In such a case, the virtual sensory data can be collected by monitoring run-time data variables available through the operating system of the source device 512, 516 or available from a graphic card or an audio card.

The sensory data representing the environment of the source device 512, 516 can be sent to the recipient device 506, 514 and/or to the server 530. The sensory data can be sent by way of a "pushing" scheme, where data is broadcast or reported from the source device 512, 516 to the recipient device 506, 514 or server 530 as determined by the source device. The sensory data can be sent by way of "pulling" scheme, where data is only sent to the recipient device and/or server when requested by the recipient device and/or server.

The sensory data representing the environment of the source device 512, 516 can be included with the media content as metadata. The metadata can provide information on the media content. In this case, the metadata can correspond to sensory data collected for an environment of the source device 512, 516, where the environment can be a physical or virtual environment a user of the source device would experience as part of the media content. For example, the temperature at the source device can be measured and saved. A user would experience the collected temperatures while viewing media content at the source device. A metadata descriptor of labeled "average temperature" can be created, or tagged, to correspond to a calculated mean value for the collected temperature readings taken at the source device. Similarly, a metadata descriptor of "hourly temperatures" can be tagged to correspond to each hourly value of the set of collected temperatures. Tagging the various sensory data measurement into metadata can be used to provide an infrastructure for sending and receiving the sensory data in a standardized format along with the media content.

If the media content is streamed from the source device 512, 516 to the server 530 or to the recipient device 506, 514, the tagged metadata can be included within a header, or overhead, section of the data stream. If the media content is sent from the source device 512, 516 to the server 530 or the recipient device 506, 514 as a discrete file or series of files, the metadata can be included as a part of one or more of the files or as a separate file. By sending the metadata within the media content data structure, the metadata is automatically included with the media content. Error detection and/or correction techniques, applicable to the streaming or file-based media content data, can be automatically applied on the metadata.

The metadata can be defined as a series of data fields or elements included in an overhead section or file of the media content data. The metadata can be included with the media content using metadata containers which can encapsulate a set of metadata as a group. The metadata containers can be defined according to standard formats, such as the American National Standards Institute (ANSI) standard. The environmental metadata can be included in metadata containers along with other metadata elements associated with media content. For example, the metadata for the sensory data can be included with metadata storing information on copyright owner, artist, data, or genre of the media content. The metadata can be included as encoded data. The metadata can be encrypted.

Individual metadata elements can be used to create a digital representation of the overall environment of the source device 512, 516. For example, the metadata descriptors for temperature, such as average temperature and hourly temperature, can be combined with similar metadata descriptors for time of day, date, location, color, location details, and other data collected from the physical or virtual environment. The combination of several or all of the metadata descriptors can be used to establish a digital environment for the source device 512, 516. That is, the set of metadata can provide a combination of environmental factors sufficient to describe an overall source device environment. The set of metadata descriptors can be described as a digital representation, or digital model, of the environment. When the set of metadata is sent along with the media content, a digital representation of the environment of the source device 512, 516 is thereby provided within the media content.

In step 604, the recipient device 506, 514 can retrieve sensory information from an environment 544, 548 of the recipient device. The sensory information can represent a physical world or a virtual world of the recipient device. The sensory information can be collected by means similar to the sensory data of the source device 512, 516, as described above. For example, the recipient device 506, 514 can capture temperature data by way of a temperature probe or can capture video data by way of a camera, as described above In step 606, the recipient device 506, 514 can identify a digital representation of the environment of the recipient device 506, 514 corresponding to the sensory information from the environment 544, 548 of the recipient device. As with the source device 512, 516, the recipient device 506, 514 can tag sensory data measured at the recipient device into metadata descriptors. Tagging the sensory data to metadata can allow the recipient device 506, 514 to share the environmental data with other devices in the same metadata format as used by the source device 512, 516. For example, the recipient device can determine a mean value or a range of values for temperature based on captured temperature data. In another example, the recipient device can convert captured video into a standard file format or into a series of still images. The recipient device 506, 514 can then use a set of all of the metadata descriptors to establish a digital environment for the recipient device 506, 514. That is, the set of metadata can provide a combination of environmental factors sufficient to describe an overall recipient device environment. The set of metadata descriptors can be described as a digital representation, or digital model, of the recipient device environment.

In step 608, the recipient device 506, 514 can determine differences between the digital representation of the environment of the source device 512, 516 and the digital representation of the environment of the recipient device. The recipient device 506, 514 can compare a set of metadata collected from the environment of the source device 512, 516 with a set of sensory information collected the environment of the recipient device. The recipient device 506, 514 can compare, for example, a physical environment at the source device 512, 516 with a physical environment at the recipient device 506, 514 by comparing the metadata descriptors from each device. For example, the source device 512, 516 may report bright lighting conditions, such a sunshine, as exhibited by lighting intensity sensory data. By comparison, the recipient device 506, 514 may have identified low-level lighting conditions based on a cloudy day or nighttime or poor indoor lighting. The recipient device 506, 514 can compare the lighting conditions as like categories and detect the differences. Similarly, the recipient device 506, 514 can compare all of the other reported or identified physical sensory data for the two devices, such as temperature, background audio, location, and the like.

For example, the recipient device 506, 514 can detect that background walls at the location of the source device 512, 516 are different than those at the location of the recipient device. The recipient device 506, 514 can detect that the background walls at the location of the source device 512, 516 are smaller or shaped differently than those at the location of the recipient device. The recipient device 506, 514 can detect that the time zone at the location of the source device 512, 516 is different than the time zone at the location of the recipient device. The recipient device 506, 514 can detect that the source device 512, 516 is located at tropical latitude while the recipient device is located in a four-season climate that is currently experiencing winter conditions.

The recipient device 506, 514 can compare value or numerical-based sensory data, such a temperature or light intensity or location coordinates. The recipient device 506, 514 can also compare content-based sensory data, such as video, audio, or still image content to determine differences and can establish where these differences are attributable to the physical environments of the source device 512, 516 and the recipient device 506, 514. The recipient device 506, 514 can also compare presentation resources of the recipient device to those of the source device 512, 516. For example, the source device 512, 516 may have sophisticated surround sound audio resources, while the recipient device 506, 514 has stereo audio presentation resources. Additionally, the source device 512, 516 may have a high definition display resource, while the recipient device 506, 514 has a standard definition display resource.

In addition to comparing physical environments, the recipient device 506, 514 can compare virtual environments. For example, source device 512, 516 can be presenting a virtual-reality video game while recipient device 506, 514 can be presenting a virtual application featuring avatars and virtual persons. The source device 512, 516 and recipient device 506, 514 can each be presenting a different virtual world, each with a virtual environment made up of many characteristics, to the users of the respective device. The recipient device 506, 514 can compare a set of metadata representing the virtual environment of the source device 512, 516 with a set of sensory information representing the virtual environment of the recipient device. For example, the source device 512, 516 may report virtual conditions of out-of-doors, darkness, and a storm in the virtual-reality game as exhibited by sensory data on virtual lighting intensity or virtual precipitation or virtual wind. By comparison, the recipient device 506, 514 may have identified low-lighting, but calm, indoor conditions, in the avatar-based game. The recipient device 506, 514 can compare the lighting, weather, and location conditions as like categories and detect the differences. Similarly, the recipient device 506, 514 can compare all of the other reported or identified virtual sensory data for the two devices, such as aroma, background audio, images, and the like. The recipient device 506, 514 can determine differences and can establish where these differences are attributable to the virtual environments of the source device 512, 516 and the recipient device 506, 514.

In addition to comparing physical-to-physical and virtual-to-virtual environments, the recipient device 506, 514 can also compare physical-to-virtual and virtual-to-physical environments. For example, the recipient device 506, 514 can compare, for example, a physical environment reported from the source device 512, 516 with a virtual environment presented at the recipient device 506, 514 by comparing the characterizing from each device. Where a characteristic of the virtual environment presented on recipient device 506, 514 imitates a real-world, physical characteristic being experienced at the source device 512, 516, the recipient device can compare the physical characteristic with the virtual (imitation) characteristic. For example, the source device 512, 516 can be at a location experiencing a passing train that can be heard as audio and felt as vibration. Characteristics of audio and/or vibration can be reported from the source device 512, 516, such as by an audio MPEG file, a background noise measurement (frequency, amplitude), or a vibration reading (frequency, amplitude). The recipient device 506, 514 can compare the reported physical sensory data to characteristics of the virtual world presented by the recipient device. The virtual world, for example, can be presenting a noisy restaurant where characteristic components of noise and vibration have been simulated. The recipient device 506, 514 can compare the noise and vibration between the physical world where a train is passing and the virtual world of the restaurant and detect differences that can be important to adapting a media presentation from physical location of the source device 512, 516 to the virtual "location" of the recipient device.

In step 612, the recipient device 506, 514 can modify a presentation of the media content according to differences between the digital representation of the environment of the source device 512, 516 and the digital representation of the environment of the recipient device 506, 514. In step 614, the recipient device 506, 514 can adapt a user interface 404 of the recipient device 506, 514 according to a difference, or combination of differences, between the digital representations of the environments of the source device 512, 516 and the recipient device. The recipient device 506, 514 can modify characteristics of a display 410 on a user interface 404 of the recipient device 506, 514 or of a user interface, such as display 508, in communication with the recipient device. For example, the source device 512, 516 can be located in bright conditions, while the recipient device 506, 514 is located in dark conditions. The recipient device 506, 514 can detect the difference in environment and adjusts settings on the display 404, 508, such as brightness, backlighting, or contrast. The recipient device 506, 514 can adjust settings of an audio system 412 to account for difference in background noise between the recipient device and the source device 512, 516.

The recipient device 506, 514 can also modify the user interface 404 to account for differences between physical and virtual worlds or between two virtual worlds. For example, a user of the source device 512, 516, such as computing device, can be watching a music video within a virtual reality, avatar-based application presented on the computing device (e.g., the user's avatar is watching the video). The user can decide to share this virtual experience on a recipient device 506, 514 in the form of a mobile phone. The user of the user of the source device 512, 516 can initiate a sharing of the music video content with the user of the recipient device 506, 514 by, for example, sending a text with a link that directs the recipient device 506, 514 to the source device 512, 516. The recipient device 506, 514 can receive the music video (media content) from the source device 512, 516 along with sensory data representing the virtual environment that the source device 512, 516 is presenting. The recipient device 506, 514 can compare the received, virtual environment characteristics of the source device 512, 516 with retrieved and identified characteristics of the physical environment of the recipient device 506, 514. The recipient device 506, 514 can determine, for example, that the virtual world presentation of the music video includes a background sound of a virtual fountain. The recipient device 506, 514 can alter the audio system 412 of the mobile phone to account for the presence of the fountain at the source device 512, 516 either by adding a fountain sound to a reproduction of the music video through the mobile phone audio system 412 (to share the complete experience of the source device user) or by reducing the playback volume of the music video though the audio system (to account for a quieter listening environment for the recipient device user).

The recipient device 506, 514 can translate or transcode the media content according to the differences between the digital representation of the environment of the source device 512, 516 and the digital representation of the environment of the recipient device 506, 514 in step 616. The recipient device 506, 514 can modify the format of the media content, can change the encoding scheme used for the media content, or can alter the media content to account for the detected environment differences when the media content is presented by or on the recipient device 506, 514. For example, the source device 512, 516 can be presenting a live cam video feed of a flock of penguins in *Antarctica* to a user who is riding on a subway train. The user of the source device 512, 516 can decide to share this television show with a user of a recipient device 506, 514. The recipient device 506, 514 can be presenting, at the same time, a virtual reality application where the user of the recipient device 506, 514 is "living" in a virtual city. The user of the recipient device 506, 514 can be attending a football game in the virtual-reality city. A scoreboard at the virtual football game can be used to display video. Various physical world phenomena at the source device 512, 516 can be retrieved by the recipient device 506, 514 as sensory data characterizing the source device environment. The recipient device 506, 514 can detect differences between the source and recipient devices. For example, the recipient device 506, 514 can transcode the media content from the source device 512, 516 to work in the virtual environment by converting from a streaming video format to an embedded video format, such as Flash™ video, a trademark of the Adobe Corporation of San Jose, Calif.

In one embodiment, the media content can be in the form of content of a virtual reality world being presented on the source device 512, 516. For example, the source device 512, 516 can be presenting a virtual reality application where an avatar of a user "lives" in a house. The house can have elements of home décor such as paintings, wall colors, and landscaping. The user decides to share her home in her virtual reality application with a user of the recipient device 506, 514, who is also a "resident" in a virtual reality application. In the context of the virtual reality application, the décor elements can be identified as characteristics of the environment of the user of the source device 512, 516. Therefore, the recipient device 506, 514 can receive the décor elements as characteristics of the source device virtual environment and compare these characteristics to the virtual environment of the recipient device 506, 514. The user of the recipient device 506, 514 can have different décor—paintings, colors, landscaping—at his house. The recipient device 506, 514 can detect these differences and alter the content of the first user's house, as presented to the second user at the recipient device 506, 514. The recipient device 506, 514 can translate the first house by substituting part of the content of the second house (to make the second user feel more at home in his friend's house).

Figure 7:
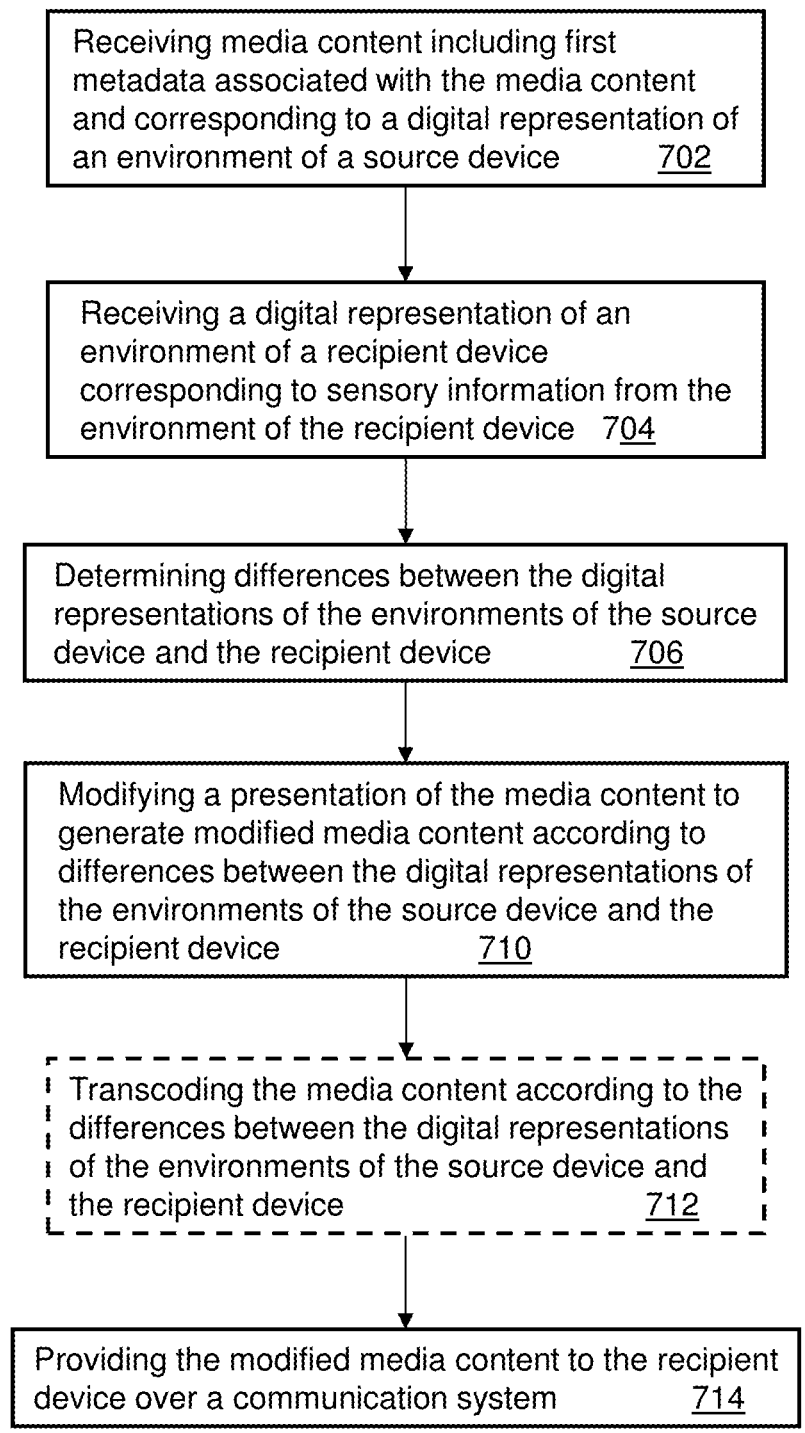

FIG. 7 depicts an illustrative method 700 that operates in portions of the devices of FIGS. 1-5. Method 700 can begin with step 702 in which a server 530 can receive media content from a source device 512, 516. The server 530 can be used as a media adaptation server. The media content can be any combination of text, audio, still images, video, three-dimensional images and video, graphics, or computer-generated media, and virtual gaming or avatar-based content. The media content can be a combination of content sourced from the service provider and content generated or modified by the source device 512, 516. The media content can be received by the server 530 directly from the source device 512, 516 or can be received by the server 530 from another device of the service provider.

The media content from the source device 512, 516 can include metadata corresponding to a digital representation of an environment 542, 546 of the source device 512, 516. The environment 542, 546 of the source device 512, 516 can be based on sensory data collected at the source device. A recipient device 506, 514 can also have an environment 544, 548 that can be represented by sensory data collected at that recipient device. The first sensory data can represent characteristics of the environment 542, 546 of the source device 512, 516 that can be derived from a "physical world" in which the device is located or from a "virtual world" being presented by the source device 512, 516, as described above. In step 704, the server 530 can receive second sensory data representing characteristics of an environment 544, 548 of the recipient device 506, 514. The second sensory data can represent characteristics of the environment 544, 548 that can be derived from a "physical world" in which the device is located or from a "virtual world" being presented by the recipient device 506, 514, as described above. Since the server 530 can be located remotely from the recipient device 506, 514, the recipient device can report sensory data to the server 530 in a fashion similar to the reporting of sensory data by the source device 512, 516 described in the prior embodiment.

In step 704, the server can receive a digital representation of an environment of a recipient device 506, 514 corresponding to sensory information from the environment of the recipient device. As with the source device 512, 516, the recipient device 506, 514 can tag sensory data measured at the recipient device into metadata descriptors. Tagging the sensory data to metadata can allow the recipient device 506, 514 to share the environmental data with other devices in the same metadata format as used by the source device 512, 516. For example, the recipient device can determine a mean value or a range of values for temperature based on captured temperature data. In another example, the recipient device can convert captured video into a standard file format or into a series of still images. The recipient device 506, 514 can then use a set of all of the metadata descriptors to establish a digital environment for the recipient device 506, 514. That is, the set of metadata can provide a combination of environmental factors sufficient to describe an overall recipient device environment. The set of metadata descriptors can be described as a digital representation, or digital model, of the recipient device environment.

In step 706, the server 530 can determine differences between the digital representation of the environments of the source device 512, 516 and the recipient device 506, 514. The server 530 can compare a set of metadata representing the environment of the source device 512, 516 with a set of sensory information representing the environment of the recipient device 506, 514. The server 530 can compare, for example, a physical environment at the source device 512, 516 with a physical environment at the recipient device 506, 514 by comparing the sensory data from each device. The server 530 can determine differences and can establish where these differences are attributable to the physical or virtual environments of the source device 512, 516 and the recipient device 506, 514. The server 530 can determine differences between digital representations of the environments of the source device 512, 516 and the recipient device 506, 514 by similar means, and with similar capabilities, as can be used by the recipient device 506, 514.

In step 710, the server 530 can modify a presentation of media content according to the differences between the digital representations of the sensory environments of the source device 512, 516 and the recipient device 506, 514. The server 530 can translate or transcode the media content according to the differences between the digital representations of the environment of the source device 512, 516 and the characteristics of the environment of the recipient device 506, 514, in step 712. The server 530 can modify the format of the media content, can change the encoding scheme used for the media content, or can alter the media content to account for the detected environment differences when the media content is presented by or on the recipient device 506, 514. The server 530 can modify the media content by similar means, and with similar capabilities, as can be used by the recipient device 506, 514.

In step 714, the server 530 can provide the modified media content to the recipient device 506, 514 over the communication system 100. The sever 530 can provide the modified media content as a file, as streaming data, or embedded in a message.

Figure 8:
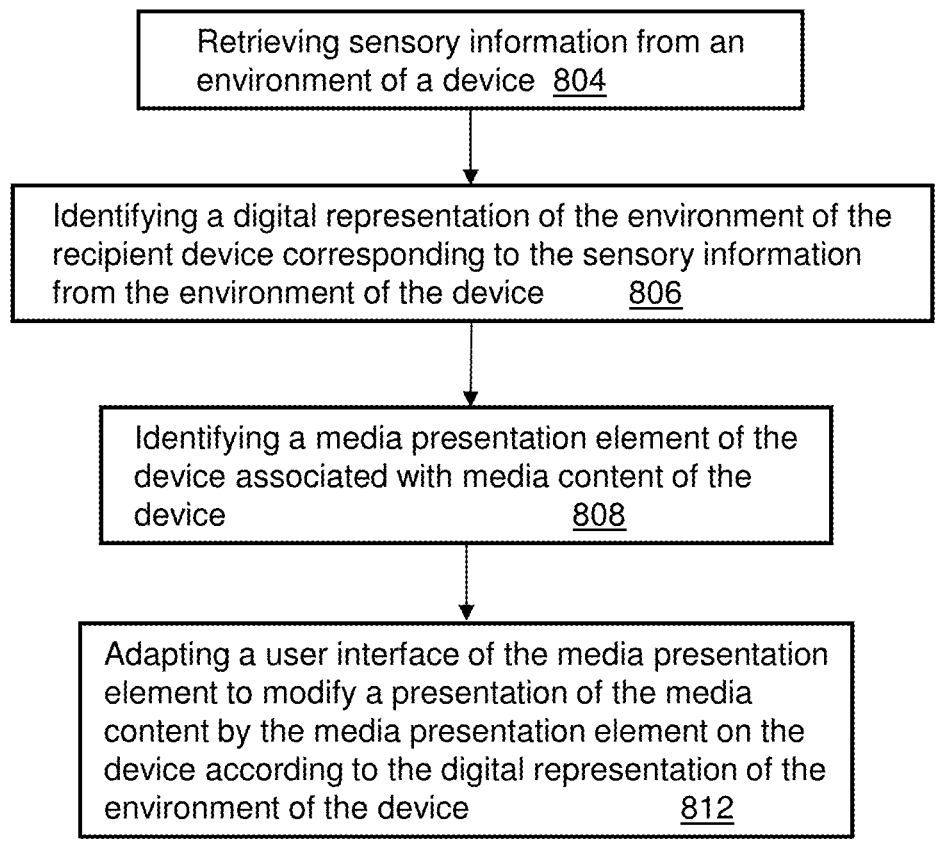

FIG. 8 depicts an illustrative method 800 that operates in portions of the devices of FIGS. 1-5. Method 800 can begin with step 804 in which sensory information can be retrieved from an environment of a device, such as a media processor 106 or a portable communications device 116. The sensory information can represent characteristics of the environment of the device that can be derived from a "physical world" in which the device is located or from a "virtual world" being presented by the device, as described above. In step 806, the device 106, 116 can identify a digital representation of the environment of the recipient device corresponding to the sensory information from the environment of the device. The device can tag sensory data measured at the device into metadata descriptors. Tagging the sensory data to metadata can allow the device to share the environmental data with other devices in a common metadata format as used by other devices. For example, the device can determine a mean value or a range of values for temperature based on captured temperature data. In another example, the device can convert captured video into a standard file format or into a series of still images. The device can then use a set of all of the metadata descriptors to establish a digital environment for the device. That is, the set of metadata can provide a combination of environmental factors sufficient to describe an overall device environment. The set of metadata descriptors can be described as a digital representation, or digital model, of the device environment.

In step 808, the device 106, 116 can identify a media presentation element of the device associated with media content available on the device. The media presentation element can be a part of user interface 404 of the device. The media presentation element can be a combination of hardware and/or software components that can allow a user of the device to experience the media content by way of, for example, seeing, hearing, feeling, or tasting the media content or a derivative of the media content. For example, the device can include software to reproduce video and audio content, encoded as a data file or a data stream, as video images that are visible on a display 410 and as audio that is audible on an audio system 412. The device can have several different media presentation elements. Some of the media presentation elements can be specialized to reproduce content only from specific formats of media content files or data streams, while other media presentation elements can reproduce from several formats or encoding schemes.

In step 812, the device 106, 116 can adapt a user interface 404 of the media presentation element to modify a presentation of the media content by the media presentation element on the device according to the digital representation of the environment of the device. The device 106, 116 can modify characteristics of a display 410 on a user interface 404 of the device 106, 116 or of a user interface, such as display 508, in communication with the device 106, 116. For example, the device 106, 116 can be located in dark conditions. The device 106, 116 can detect the environment and adjusts settings on the display 404, 508, such as brightness, backlighting, or contrast. The device 106, 116 can adjust an audio system 412 to account for background noise at the device 106, 116.

Upon reviewing the aforementioned embodiments, it would be evident to an artisan with ordinary skill in the art that said embodiments can be modified, reduced, or enhanced without departing from the scope and spirit of the claims described below. In one embodiment, the metadata descriptors can include metadata descriptors to store, transmit, and receive video, audio, or still image content. In one embodiment, the server 530 can retrieve a set of metadata descriptors from the recipient device 506, 514, where the recipient device has tagged the collected sensory data into a set of metadata. In one embodiment, the server 530 can retriever a digital representation of the environment of the recipient device 506, 514, where the recipient device has tagged the collected sensory data into metadata and has grouped the metadata into a digital representation.

In one embodiment, the recipient device 506, 514 or the server 530 can use object recognition applications to compare known patterns, objects, shapes, sounds, and/or places that appear in the video, audio, or still image content reported or identified as being of the source device 512, 516 and/or the recipient device 506, 514. By comparing recognized objects, patterns, shapes, sounds, and/or places, differences in the environments of the source device 512, 516 and the recipient device 506, 514 can be determined to guide modification of the media content or of the user interface of the recipient device 506, 514. In one embodiment, the recipient device 506, 514 or the server 530 can use object recognition applications to compare known patterns, objects, shapes, sounds, and/or places that appear in any virtual video, audio, or still image content reported or identified for the source device 512, 516 and/or the recipient device 506, 514. Other embodiments are contemplated by the present disclosure.

Figure 9:
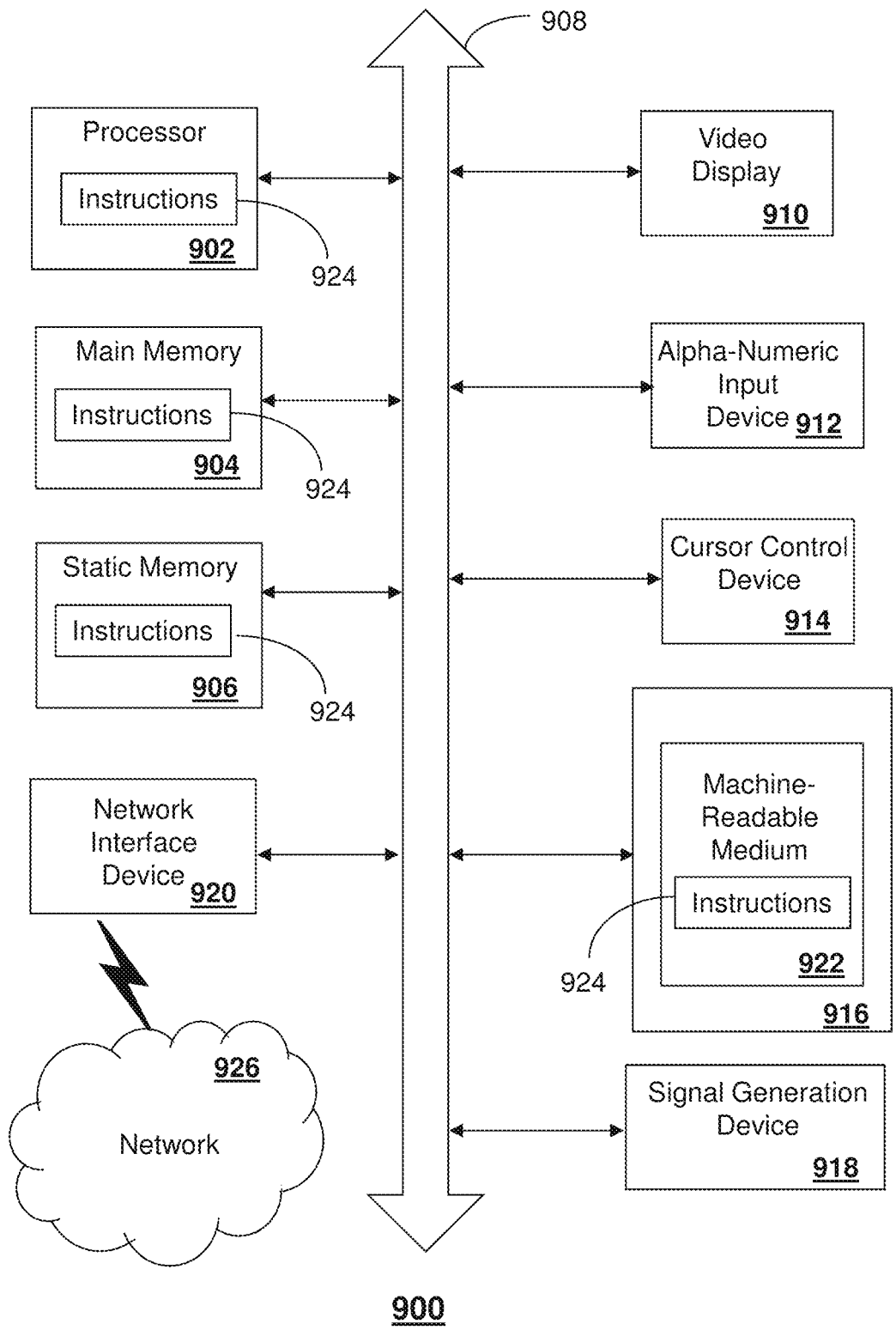
FIG. 9 is a diagrammatic representation of a machine in the form of a computer system within which a set of instructions, when executed, may cause the machine to perform any one or more of the methods discussed herein.

FIG. 9 depicts an exemplary diagrammatic representation of a machine in the form of a computer system 900 within which a set of instructions, when executed, may cause the machine to perform any one or more of the methods discussed above. One or more instances of the machine can operate, for example, as the server 530, the media processor 506, the display 508, computing devices 512, mobile devices 514, or combinations thereof as described above. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZigBee), and long-range communications (e.g., WiMAX, GSM, CDMA) are contemplated for use by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile communication device comprising:
a processing system including a processor; and
a memory that stores executable instructions that, when executed by the processing system, facilitate performance of operations comprising:
obtaining media content from a source device, wherein the media content comprises metadata descriptive of a digital representation of a first environment of the source device, wherein the first environment comprises first physical images of a first real environment sensed by a source sensor coupled to the source device;
obtaining sensory information descriptive of a second environment of a recipient sensor coupled to the processor, the second environment comprising second physical images of a second real environment sensed by the recipient sensor;
determining a difference between a first recognized object of the first environment and a second recognized object of the second environment based on the first physical images and the sensory information; and
modifying a presentation of the media content to generate a modified reproduction of the media content based on the difference between the first recognized object of the first environment and the second recognized object of the second environment, wherein the modifying comprises adapting the mobile communication device by modifying characteristics of a graphical user interface of the mobile communication device according to the difference between the first recognized object of the first environment and the second recognized object of the second environment.

2. The mobile communication device of claim 1, wherein the difference is determined according to object recognition applied to the first physical images and the sensory information.

3. The mobile communication device of claim 2, wherein the object recognition identifies known shapes of the first recognized object and the second recognized object.

4. The mobile communication device of claim 1, wherein the modifying comprises transcoding the media content.

5. The mobile communication device of claim 1, wherein the modifying comprises altering an encoding scheme used for the media content according to the difference between the first recognized object and the second recognized object.

6. The mobile communication device of claim 1, wherein the operations further comprise providing the modified reproduction of the media content as a file, as streaming data, in a message, or a combination thereof.

7. The mobile communication device of claim 1, wherein the first recognized object and the second recognized object are external to the source device and the recipient sensor respectively.

8. The mobile communication device of claim 1, wherein the adapting the mobile communication device comprises modifying characteristics of a display of the mobile communication device.

9. The mobile communication device of claim 1, wherein the adapting the mobile communication device comprises modifying characteristics of an audio system of the mobile communication device.

10. The mobile communication device of claim 1, wherein the metadata comprises audio metadata and video metadata.

11. A method comprising:
obtaining, by a processing system including a processor of a mobile communication device, media content from a source device, wherein the media content comprises metadata descriptive of a representation of a first environment of the source device, wherein the metadata comprises audio metadata, video metadata or a combination thereof, and wherein the first environment comprises first physical images of a first real environment sensed by a source sensor coupled to the source device;
obtaining, by the processing system, sensory information descriptive of a second environment of a recipient sensor coupled to the processor, the second environment comprising second physical images of a second real environment sensed by the recipient sensor;
determining, by the processing system, a difference between a first recognized object of the first environment and a second recognized object of the second environment based on the first physical images and the sensory information; and
modifying, by the processing system, a presentation of the media content to generate a modified reproduction of the media content based on the difference between the first recognized object of the first environment and the second recognized object of the second environment, wherein the modifying comprises adapting the mobile communication device by modifying characteristics of a graphical user interface of the mobile communication device according to the difference between the first recognized object of the first environment and the second recognized object of the second environment.

12. The method of claim 11, wherein the difference is determined according to object recognition applied to the first physical images and the sensory information.

13. The method of claim 11, wherein the modifying comprises transcoding the media content.

14. The method of claim 11, wherein the modifying comprises altering an encoding scheme used for the media content according to the difference between the first recognized object and the second recognized object.

15. The method of claim 11, further comprising providing, by the processing system, the modified reproduction of the media content as a file, as streaming data, in a message, or a combination thereof.

16. A non-transitory machine-readable medium comprising executable instructions that, when executed by a processing system including a processor of a mobile communication device, facilitate performance of operations comprising:
obtaining media content from a source device, wherein the media content comprises metadata descriptive of a representation of a first environment of the source device, wherein the first environment comprises first physical images of a first real environment sensed by a source sensor coupled to the source device;
obtaining sensory information descriptive of a second environment of a recipient sensor coupled to the processor, the second environment comprising second physical images of a second real environment sensed by the recipient sensor;
determining a difference between a first recognized object of the first environment and a second recognized object of the second environment based on the first physical images and the sensory information; and
modifying a presentation of the media content to generate a modified reproduction of the media content based on the difference between the first recognized object of the first environment and the second recognized object of the second environment, wherein the modifying comprises adapting the mobile communication device by modifying characteristics of a graphical user interface of the mobile communication device according to the difference between the first recognized object of the first environment and the second recognized object of the second environment.

17. The non-transitory machine-readable medium of claim 16, wherein the difference is determined according to object recognition applied to the first physical images and the sensory information.

18. The non-transitory machine-readable medium of claim 16, wherein the modifying comprises transcoding the media content.

19. The non-transitory machine-readable medium of claim 16, wherein the modifying comprises altering an encoding scheme used for the media content according to the difference between the first recognized object and the second recognized object.

20. The non-transitory machine-readable medium of claim 16, wherein the operations further comprise providing the modified reproduction of the media content as a file, as streaming data, in a message, or a combination thereof.

* * * * *